2,952,276
LOW VOLUME CLUTCH TUBE
Charles P. Warman, Jr., 4 Crestway, Wichita Falls, Tex.
Filed Apr. 7, 1958, Ser. No. 726,954
4 Claims. (Cl. 137—784)

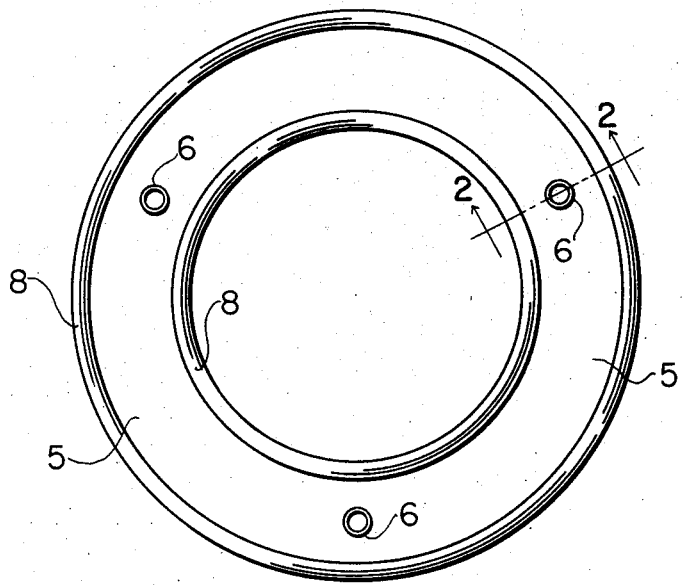
Fig. I
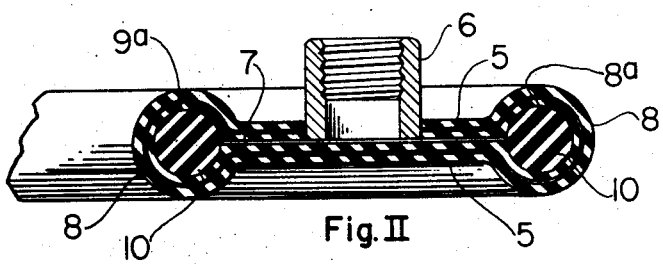
Fig. II
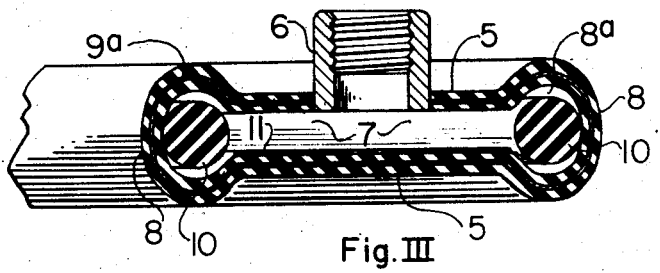
Fig. III
INVENTOR.
CHARLES P. WARMAN
BY
*G.C.Waldrop*
ATTORNEY

# United States Patent Office 2,952,276
Patented Sept. 13, 1960

This invention relates to fluid or liquid actuated flexible sectioned tubes for clutches and brakes of the ring or disk type, the invention residing principally in the provision of such tubes of substantially zero volume of interior cavity when in the closed or unactivated position and correspondingly of lower volume than other tubes heretofore provided. My tubes may be used in conventional clutch and brake mechanisms not shown, or when maximum stroke tubes are required these conventional mechanisms need be modified only to accommodate the correspondingly enlarged flex sections of my tubes as will be readily perceived by those skilled in the art.

The construction and operation of my novel tube will be apparent from the following description together with the accompanying drawings in which:

Figure I is a side elevation of my tube;

Figure II is a section along line 2—2 of Figure I when the tube is deflated; and Figure III shows the section of Figure II in a partially inflated position.

In the several figures like references indicate similar parts wherein 5—5 are flat ring portions of my tube as bearing surfaces to contact parts of a clutch not shown, one of which portions has spud or opening 6 communicative with cavity 7 between the flat portions 5 through which activating fluid may be introduced into and discharged from the tube as desired. About the inner and outer diameters of the flat portions, enlarged flex sections 8—8 are integrally formed, preferably reinforced by suitable cord or fabric to withstand desired operating pressures within the tube. Within the flex sections there are provided circularly disposed cavities 8a—9a of suitable sizes to provide flex sections readily accommodative of the desired stroking of the tube in a clutch. These and cavities 8a and 9a are but continuations of central cavity 7 between the flat or bearing portion 5 of my tube. Preferably O rings 10 are introduced into circular cavities 8a and 9a of suitable cross section as to effectively fill cavities 8a and 9a when the tube is in deflated position as shown in Figure II. These O rings will preferably be of a cross section greater than the expanded depth or cavity 7 of the tube in stroke as shown in Figure III. Grooves or channels 11 may be provided on the inner faces of the flat portions of my tube whereby to facilitate movement into and out of cavities 7, 8a and 9a of the activating medium.

In the manufacture of my novel tube a preferred method is to form the flat faces 5—5 as separate units, then to place their inner faces together and bring the O rings into position adjacent their inner and outer diameters after which the flex sections 8—8 are applied and the whole moulded together in a unitary structure. Suitable reinforcings will have been used in the construction of the respective parts to provide for operation under desired pressures of the actuating medium.

What I claim is:

1. A clutch tube in the form of a modified toroid having flat face portions joined at their peripheries by flex sections, one of said faces having a spud opening passing therethrough, the flex sections defining end cavities of greater cross section than the central cavity between the face portions, and an O ring in each of the end cavities, said O rings being mutually separate and independent and being of greater cross-sectional diameter than the depth of the central cavity between the face portions when the tube is fully expanded.

2. An inflatable actuator comprising a modified toroidal resilient tube having an axis and having a pair of mutually opposed actuator walls joined by a second pair of mutually opposed flexing walls, the latter comprising convex end walls and being substantially circular in all cross-sections taken in planes including said axis, and said actuator walls being mutually parallel and in mutual contact when the tube is deflated and being mutually spaced to define a central cavity of depth equal to the stroke of the tube when fully inflated, and said central cavity communicating with annular enlarged end cavities adjacent the said substantially circular flexing walls; and separate and independent resilient O-rings in each of said enlarged end cavities and fully occupying the latter when the tube is deflated.

3. In an actuator as set forth in claim 2, an inflation spud in at least one of said actuator walls.

4. In an actuator as set forth in claim 2, the cross sectional diameters of each of said O-rings being greater than the depth of the central cavity when the actuator is fully inflated.

References Cited in the file of this patent

UNITED STATES PATENTS

| | | |
|---|---|---|
| 2,251,444 | Fawick | Aug. 5, 1941 |
| 2,612,909 | Keller | Oct. 7, 1952 |
| 2,660,074 | Wilson | Nov. 24, 1953 |
| 2,688,983 | Bowerman | Sept. 14, 1954 |